(12) United States Patent
Kawasumi et al.

(10) Patent No.: US 6,883,415 B2
(45) Date of Patent: Apr. 26, 2005

(54) BRAKE BOOSTER DEVICE

(75) Inventors: Satoshi Kawasumi, Takahama (JP); Tomoo Ogura, Aichi-ken (JP); Yoji Inoue, Toyoake (JP)

(73) Assignee: Advics Co., Ltd., Kariya (JP)

( * ) Notice: Subject to any disclaimer, the term of this patent is extended or adjusted under 35 U.S.C. 154(b) by 157 days.

(21) Appl. No.: 10/327,056

(22) Filed: Dec. 24, 2002

(65) Prior Publication Data

US 2003/0167913 A1 Sep. 11, 2003

(30) Foreign Application Priority Data

Dec. 25, 2001 (JP) ........................................ 2001-391149

(51) Int. Cl.[7] ................................................. F15B 9/10
(52) U.S. Cl. .................................................. 91/376 R
(58) Field of Search ............................ 91/376 R, 369.2

(56) References Cited

U.S. PATENT DOCUMENTS 4,598,548 A * 7/1986 Wagner ...................... 91/369.2

FOREIGN PATENT DOCUMENTS

| JP | 11-43039 A | 2/1999 |
|----|------------|--------|
| JP | 2967378 B2 | 8/1999 |

* cited by examiner

Primary Examiner—Edward K. Look
Assistant Examiner—Michael Leslie
(74) Attorney, Agent, or Firm—Burns, Doane, Swecker & Mathis, L.L.P.

(57) ABSTRACT

A brake booster device for use in a brake system of vehicles is provided with a partition member dividing the interior of the booster shell into front and rear chambers and a piston movable bodily with the partition member within the booster shell. A control valve body is carried on the piston to move toward and away from the rear surface of the piston through a predetermined amount. An air valve member is received within the piston for relative movement thereto and is urged by a compression spring to be moved rearwardly. When the brake pedal is stepped on, the air valve member is forwardly moved by an input rod relative to the piston, whereby the control valve member leads the atmospheric pressure to the rear chamber thereby to move the partition member and the piston forwardly from a home position. When the brake pedal is released, on the contrary, the control valve leads a negative pressure from the front chamber to the rear chamber thereby to permit the partition member and the piston to move rearwardly to the home position by the force of a return spring. The movement of the piston operates a master cylinder through an output rod to generate braking power.

12 Claims, 6 Drawing Sheets

BRAKE BOOSTER DEVICE

INCORPORATION BY REFERENCE

This application is based on and claims priority under 35 U.S.C. sctn. 119 with respect to Japanese Application No. 2001-391149 filed on Dec. 25, 2001, the entire content of which is incorporated herein by reference.

BACKGROUND OF THE INVENTION

1. Field of the Invention

The present invention relates to a brake booster device for use in a brake system for vehicles.

2. Discussion of the Related Art

A brake booster device of this kind is disclosed in Japanese Patent No. 2967378 issued on Oct. 25, 1999. In this known device, the interior of a booster shell is divided by a diaphragm into a variable pressure chamber and a constant pressure chamber, and the diaphragm is moved by the force of a return spring urging the diaphragm rearwardly and in response to the difference in pressure between the both chambers. The diaphragm is bodily provided with a piston for transmitting the movement thereof in a front-rear direction to an output member which passes through a front wall of the booster shell airtightly. A protruding portion which a rear part of the piston is moved into and out is provided at the center portion of a rear wall of the booster shell to project rearwardly. A cylindrical flexible member like a bellow is tightly fit at its one end into the internal surface of a rear part of the protruding portion and at its other end on the external surface of a rear part of the piston. A retainer is contained in a cave which is provided from the rear end surface of the piston co-axially. An air valve member coupled to an input rod is received in the piston to be slidable relative thereto through a predetermined amount in the front-rear direction. A compression spring is provided for urging the air valve member in such a rearward direction that the air valve portion of the air valve member closes a port which is provided on the retainer for making the variable pressure chamber in communication with the atmospheric pressure. Another compression spring is further provided for urging the retainer in such a forward direction that a negative pressure valve operating portion formed on the retainer closes a negative pressure valve portion which is formed on the piston for making the variable pressure chamber in communication with the constant pressure chamber. Further, a cylindrical portion is protruded from the front end portion of the piston which is exposed into the constant pressure chamber, while a guide cylinder formed on the rear end portion of a master cylinder passes airtightly through the front wall of the booster shell to extend into the constant pressure chamber, so that the piston is guided with the cylindrical portion thereof being snugly fit on the outer surface of the guide cylinder.

However, in the prior art of the aforementioned configuration, the negative pressure valve portion has to be formed within the cave formed in the piston, and the retainer, the air valve member, two compression springs and the like have to be received within the cave. This disadvantageously causes the piston to be larger and complicated in shape and also causes the number of parts to increase. In addition, the spring force of the return spring constitutes an inner resistance, so that the braking power may disadvantageously be lowered when the negative pressure in the constant pressure chamber is lost.

SUMMARY OF THE INVENTION

It is therefore a primary object of the present invention to provide an improved brake booster device capable of employing a dimensionally smaller piston for generating the pressure difference between a variable pressure chamber and a constant pressure chamber of a booster shell when a braking force is applied.

Another object of the present invention is to provide an improved brake booster device capable of diminishing the resistance which acts against a piston moved when a brake pedal is stepped on.

Another object of the present invention is to provide an improved brake booster device of the character that the cooperation in mating end surfaces between a piston and a valve member is utilized for controlling the braking power so that the device can be simplified in construction and reliable in operation.

Briefly, according to the present invention, there is provided a brake booster device comprising a booster shell; a partition member dividing the interior of the booster shell into a variable pressure chamber and a constant pressure chamber; an output member passing through a front wall of the booster shell airtightly; a piston provided bodily with the partition member for transmitting the movement in a front-rear direction of the partition member responsive to the pressure difference between the variable pressure chamber and the constant pressure chamber, to the output member; a control valve body provided to face a rear surface of the piston and to be movable relative thereto through a predetermined amount in the front-rear direction for being restricted from further moving rearwardly upon abutment with a rear wall of the booster shell; and a seal member interposed between the rear wall of the booster shell and the control valve body for maintaining the variable pressure chamber in airtight state. A valve hole is formed in the piston and communicates with a front surface thereof exposed to the constant pressure chamber and a rear surface thereof facing the control valve body. A negative pressure valve portion is provided at the rear surface of the piston to encircle the valve hole; and a negative pressure valve operating portion is provided on said control valve body for being brought into abutment with the negative pressure valve portion when the control valve body is advanced relative to the piston. An air valve member is received in a cave formed at the rear end portion of the piston to be movable in the front-rear direction and has an air valve portion formed at a rear surface thereof in the form of a closed loop; and an air valve operating portion is provided on the control valve body for selectively opening and closing the air valve portion. A resilient member is provided for rearwardly urging the air valve member towards the air valve operating portion; and a passage is provided for leading the atmospheric pressure to the variable pressure chamber when the air valve member is forwardly moved to separate the air valve portion from the air valve operating portion. Further, an input rod coupled to a brake pedal passes through the rear wall of the booster shell and the through hole formed in the control valve body and is coupled to the air valve member.

In another aspect of the present invention, there is provided a brake booster device comprising a booster shell; a partition member dividing the interior of the booster shell into a variable pressure chamber and a constant pressure chamber; an output member passing through a front wall of the booster shell airtightly; a piston provided bodily with the partition member for transmitting the movement in a front-rear direction of the partition member responsive to the pressure difference between the variable pressure chamber and the constant pressure chamber, to the output member, the piston having a valve hole which opens to front and rear surfaces thereof for communication of the constant pressure chamber with the variable pressure chamber; an air valve member received in the piston to be movable in the front-rear direction; a resilient member for urging the air valve member to move rearwardly relative to the piston; and an input rod coupled to a brake pedal and passing through a through hole formed at the rear wall of the booster shell to be coupled to the air valve member. A control valve body is carried to face a rear surface of the piston and to be movable relative thereto through a predetermined amount in the front-rear direction and is restricted from further moving rearwardly upon abutment at a rear surface thereof with the rear wall of the booster shell. A flexible seal member is arranged between the rear wall of the booster shell and the control valve body for maintaining the variable pressure chamber in airtight state. The control valve body is operable to isolate the variable pressure chamber from the valve hole of the piston and the atmospheric pressure when in abutment with the rear surfaces of the piston and the air valve member, but to fluidically connect the variable pressure chamber with the constant pressure chamber through the valve hole when separated from the rear surface of the piston and also to fluidicaly connect the variable pressure chamber to the atmospheric pressure when separated from the air valve member.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

Figure 1:
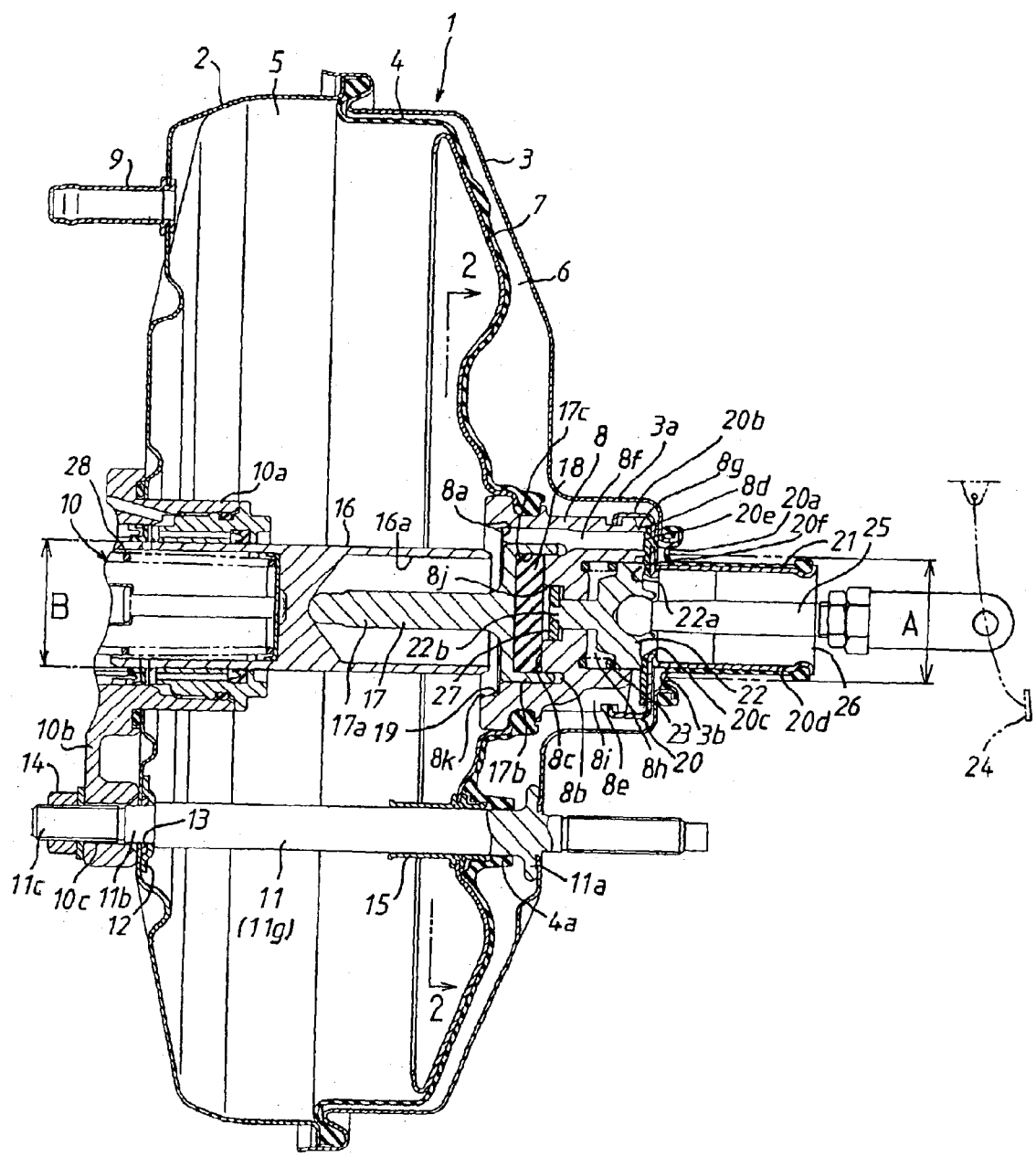
FIG. 1 is a longitudinal section of a first embodiment of a brake booster device according to the present invention.

Hereinafter, a first embodiment of a brake booster device according to the present invention will be described with reference to the drawings. As shown in FIG. 1, a booster shell 1 is composed of a front shell 2 defining a front wall and a rear shell 3 defining a real wall. Between the shells 2 and 3, a flexible diaphragm 4 is airtightly sandwiched at the peripheral edge beading thereof and operates as a partition member which divides the interior of the booster shell 1 into a constant pressure chamber 5 at the front side and a variable pressure chamber 6 at the rear side.

A disc-like plate 7 is overlapped over the diaphragm 4 within the constant pressure chamber 5. A piston 8 is airtightly secured at an external surface of its front end portion to center holes formed on the diaphragm 4 and the plate 7. The front end of the piston 8 is exposed within the constant pressure chamber 5. A negative pressure inlet pipe 9 is secured to the front shell 2. The constant pressure chamber 5 is in communication with an intake manifold of an engine through the negative pressure inlet pipe 9 and is maintained at the negative pressure of a certain level.

Figure 2:
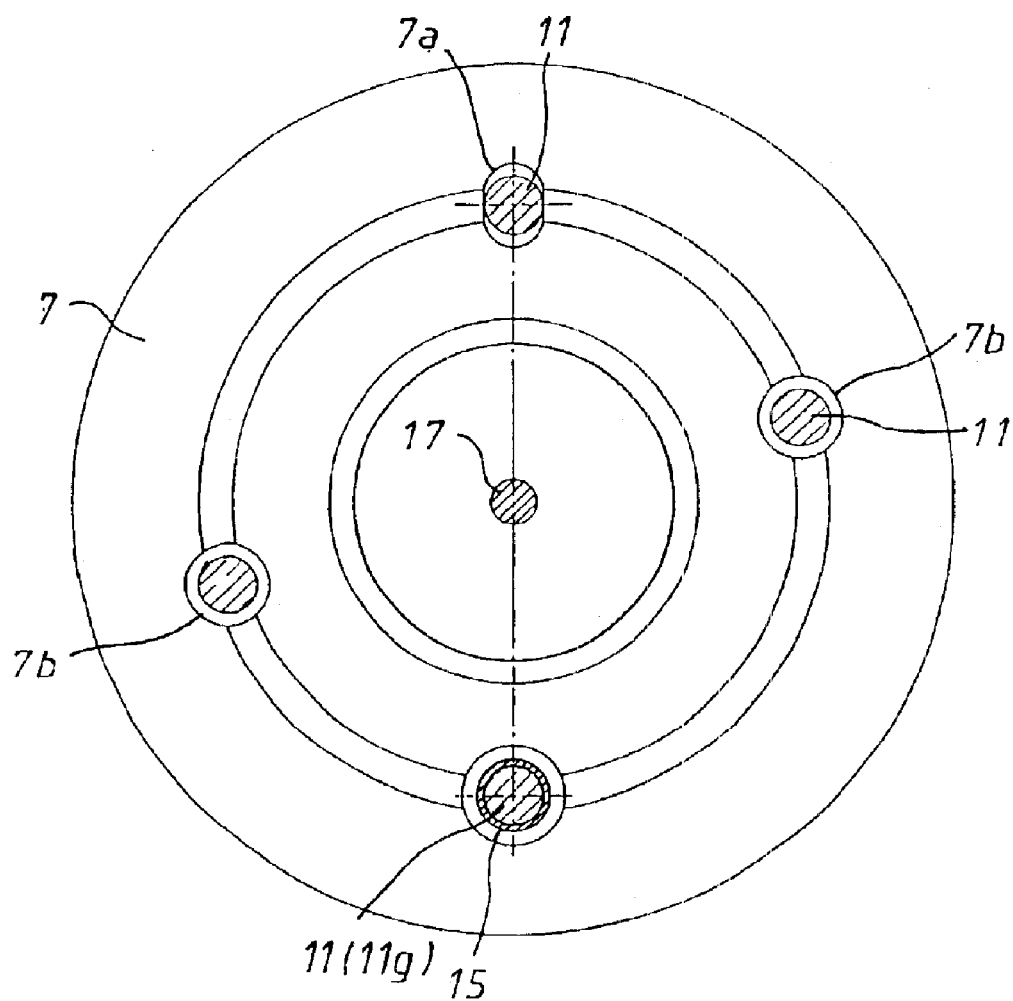
FIG. 2 is a fragmentary sectional view taken along the line 2—2 of FIG. 1.

A numeral 10 denotes a master cylinder, whose rear end 10a passes through a center hole formed on the front shell 2 and protrudes within the constant pressure chamber 5 airtightly. A flange portion 10b of the master cylinder 10 is in abutting engagement with the rear surface of the front shell 2. As best shown in FIG. 2, the front shell 2 and rear shell 3 are coupled by means of a plurality, e.g., four tie-rods 11 thereby to be secured to the master cylinder 10. The tie-rods 11 are arranged in an equiangular relation on a circle which is across almost the radially middle position between the axis and the circumferential surface of the booster shell 1 composed by the front and rear shells 2, 3. The rods 11 extend in parallel to the axis of the booster shell 1.

More specifically, the tie-rods 11 are airtightly in abutting engagement at a flanged attachment seat 11a thereof with the interior surface of the rear shell 3 within the variable pressure chamber 6. Each of the rods 11 rearwardly extends a rear end portion thereof through the rear shell 3 and is secured to the rear shell 3 by deforming a part of the rear end portion against the rear shell 3. A small diameter portion 11b formed on one or front end of each tie-rod 11 passes through the front shell 2 airtightly and protrudes ahead of the front shell 2. In the state assembled, a plate-like washer 12 fitted on the small diameter portion 11b is in abutment with a shoulder of the small diameter portion 11b and at the same time, with the interior of the front shell 2. Also, a seal 13 airtightly fit on the small diameter portion 11b is urged by the washer 12 to be pressured upon the interior of the front shell 2.

The small diameter portion 11b passes through an installation hole 10c formed at the flange portion 10b of the master cylinder 10. By fastening up a nut 14 which engages a male screw 11c formed on the front end of the small diameter portion 11b, the front shell 2 and the flange portion 10b are sandwiched between the nut 14 and the washer 12. This ensures that the booster shell 1 is secured to the master cylinder 10 and at the same time, that the front shell 2 and the rear shell 3 are drawn to each other to be coupled thereby.

As shown in FIGS. 1 and 2, a sliding hole which is formed at each of sealing portions of the diaphragm 4 is fit on the associated tie-rod 11 to be slidable therealong airtightly, so that the airtight partitioning is maintained between the constant pressure chamber 5 and the variable pressure chamber 6. On one tie-rod 11g also acting to guide the plate 7, there is slidably guided in the front-rear direction a cylindrical guide 15, which is bodily secured to the plate 7 by being fit in a fixing hole formed in the plate 7 and being deformed against the plate 7. The both ends of a guide 15 are made into mouths which are bent to smoothly open toward the radial outside, so that the guide 15 is prevented from biting the external surface of the tie-rod 11g. As viewed in FIG. 2, another tie-rod 11 which resides at the opposite to the tie-rod 11g co-acting as guide with respect to the axis of the booster shell 1 is inserted into an elongate hole 7a. This prevents the plate 7 from pivoting around the tie-rod 11g also acting as guide. Other tie-rods 11 are inserted with plays into through holes 7b formed in the plate 7.

A numeral 16 denotes a master piston as an output member, which penetrates the front shell 2 airtightly. The piston 16 is inserted into the master cylinder 10 slidably in the front-rear direction and protrudes into the constant pressure chamber 5 from one or rear end portion 10a of the master cylinder 10 to extend close to the front end face 8a of the piston 8. The cross-section area of the master piston 16 whose diameter is B is equal to the cross-section area Sb of the portion where the master piston 16 penetrates airtightly into the front shell 2 which constitutes the front wall of the booster shell 1.

An output rod 17 is interposed between the piston 8 and the master piston 16, and the piston 8 operates to transmit the movement in the front-rear direction of the diaphragm 4 which is responsive to the pressure difference between the constant pressure chamber 5 and the variable pressure chamber 6, to the master piston 16 through the output rod 17. Namely, a connection hole 16a is formed in the master piston 16 to extend from the rear end surface in the axial direction. The bottom of the connection hole 16a defines a conical space whose top is rounded. The output rod 17 is formed with a rod portion 17a which is in abutting engagement at the tip of the rod portion 17a with the rounded bottom surface of the connection hole 16a, so that the rod portion 17a is automatically brought into alignment with the master piston 16.

Figure 3:
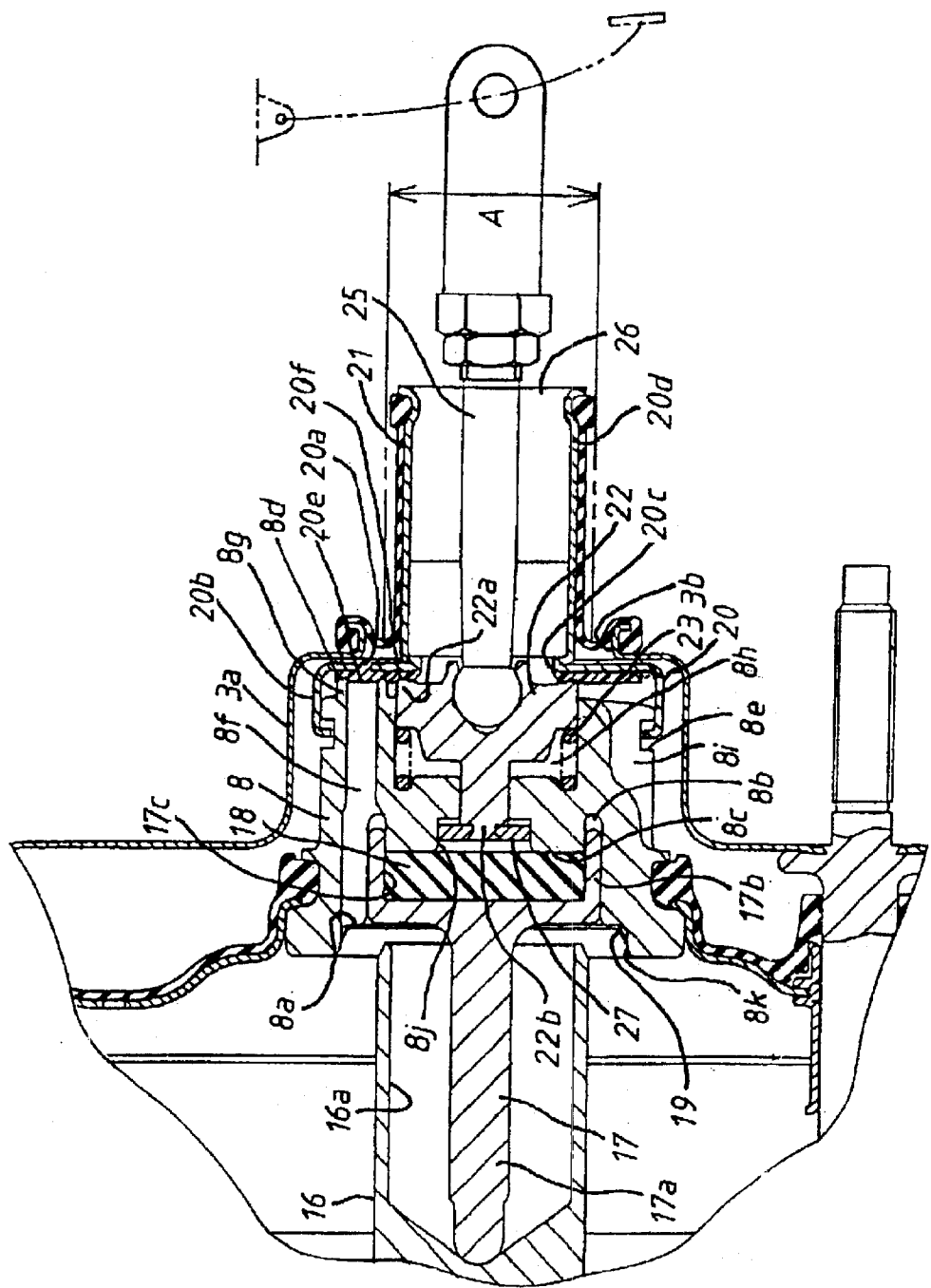
FIG. 3 is an enlarged, fragmentary sectional view of the rear central part of the device shown in FIG. 1.

As best shown in FIG. 3, annular projection 17b formed at the rear end of output rod 17 is axially movably fit in mating annular recess 8b which is formed in the piston 8 to extend rearwardly from the front end surface 8a. A disc-like counter force member 18 made of an elastic material is received in a counter force chamber 17c surrounded by the annular projection 17b of the output rod 17. The counter force member 18 is interposed between a counter force end surface surrounded by the annular recess 8b of the piston 8 and the bottom surface of the counter force chamber 17c. The member 18 is compressively deformable by the force which the piston 8 exerts on the output rod 17 or the master piston 16. The piston 8 is formed at its front end surface with a shallow entrance hole 8k which is larger in diameter than the annular recess 8b, and the bottom surface of the entrance hole 8k forms the front end surface 8a. Since a counter force end surface 8c recedes from the front end surface 8a, the back surface of the annular projection 17b comes to align nearly with the front end surface 8a in the front-rear direction when the annular projection 17b is inserted into the annular recess 8b with the counter force member 18 interposed therebetween. A ring spring 19 is fit in the entrance hole 8k and is secured thereto by deformation to be in abutment on the front side surface of the portion extending the annular projection 17b, so that the annular projection 17b is prevented from coming out of the annular recess 8b.

The rear shell 3 is formed at the center thereof with a cylindrical projection 3a protruding rearwardly. As best shown in FIG. 3, the rear end portion of the projection 3a is bent radially inwardly to form a through hole 3b on its axis. A numeral 20 designates a control valve body taking the form of a ring-like flapper. The valve body 20 has a valve portion 20a to face with the rear end surface 8d of the piston 8. The valve body 20 is formed at its external surface with a fitting portion 20b, at which it is carried on the rear end portion of the piston 8 for relative movement thereto in the front-rear direction. The front end portion of the fitting portion 20 is bent radially inwardly at plural circumferential portions thereof, which are received in an annular recess 8e of a narrow width formed at the rear end portion of the piston 8, so that the movement of the piston 8 relative to the control valve body 20 in the front-rear direction is limited to a predetermined amount or distance. When the piston 8 is retracted to a retracted or home position, the control valve body 20 is forced to come into abutment with a radial wall around the through hole 3b of the cylindrical projection 3a to be restricted from rearward movement. A cylindrical portion 20d having an internal surface whose diameter is nearly equal to the through hole 20c formed on the axis thereof is protruded rearwardly from the valve portion 20a of the control valve body 20. To keep the variable pressure chamber 6 airtight, a cylindrical, flexible seal member 21 serving as an airtight member is airtightly secured at its one or rear end to the rear end portion of the cylindrical member 20d and is also airtightly secured at the other or front end thereof to the cylindrical projection 3a, the other end surrounding the through hole 3b.

The area of a circle which has a diameter A as an approximate average between the diameter of the through hole 3b and the outer diameter of the flexible seal member 21 is equal to an effective area Sa over which the ambient or atmospheric pressure acts on the piston 8 through the through hole 3b of the rear shell 3. Further, the section area Sb of the portion where the master piston 16 passes through the front shell 2 airtightly is chosen to be almost equal or larger than the effective area Sa where the atmospheric pressure acts on the piston 8 through the through hole 3b of the rear shell 3. In other words, the diameter B of the master piston 16 is chosen to be almost equal to or larger than the diameter A.

The piston 8 is formed with one or, preferably, diametrically opposed two valve holes 8f to communicate with the front end surface 8a which is a part of the front side portion exposed to the constant pressure chamber 5 and also with to the rear end surface 8d which faces the control valve body 20. A negative pressure valve portion 8g of an annular shape surrounding each of the valve holes 8f is slightly protruded from the rear end surface 8d of the piston 8. The valve portion 20a of the control valve body 20 is provided with a negative pressure valve operating portion 20e which is brought into abutment with the negative pressure valve portion 8g when the control valve body 20 advances relative to the piston 8.

The piston 8 is also formed at the rear end surface with a cylindrical space or cave 8h, in which an air valve member 22 is inserted slidably in the front-rear direction. Between the bottom of the cave 8h and the air valve member 22, there is interposed a compression spring 23 as a resilient member, by which the valve member 22 is urged rearwardly towards the control valve body 20, so that an air valve portion 22a which is formed in the form of a closed loop or an annulus at the rear surface of the air valve member 22 is brought into abutment on an air valve operating portion 20f formed at the valve portion 20a of the control valve body 20.

A passage 8i like a cut-out recess is formed on the piston 8 for introducing the atmospheric pressure into the variable pressure chamber 6 when the forward movement of the air valve member 22 causes the air valve portion 22a to depart from the air valve operating portion 20f. A brake pedal 24 is coupled to an input rod 25, which, radially inside the air valve portion 22a, is in turn coupled to the air valve member 22 through the cylindrical projection 3a of the rear shell 3 and through the through holes 3b, 20c. A cylindrical portion 20d of the control valve body 20 has plugged therein an air filter 26, through which the input rod 25 passes airtightly.

The air valve member 22 protrudes a connection rod 22b from its front end. The connection rod 22b passes through a wall between the bottom of the cave 8h of the piston 8 and the reaction force chamber 8c and extends into a connection chamber 8j which is formed to recede rearwardly from the end surface of the reaction force chamber 8c. A connection member 27 fixed on the tip of the connection rod 22b is selectively abuttable upon the bottom surface of the connection chamber 8j and the reaction member 18, so that the movement of the air valve member 22 relative to the piston 8 is limited to a predetermined amount or distance.

Although the passage 8i for admitting the atmospheric pressure into the variable pressure chamber 6 takes the shape of a cutout recess, the shape of the passage 8i is not limited to such shape. In another form, the passage 8i is not provided on the piston 8, and instead, it may be constituted by a plurality of radial passages which opens at the fitting portion 20b of the control valve body 20.

(Operation)

The operation of the brake booster device as constructed above will be described hereinafter. When the brake pedal 24 is stepped on to advance the air valve member 22 through the input rod 25 relative to the piston 8 against the resilient force of the compression spring 23, the air valve portion 22a is forced to come off the air valve operating portion 20f of the control valve body 20. The atmosphere air filtered by means of the air filter 26 flows into the variable pressure chamber 6 through the passage 8i from the through hole 20c. In response to the pressure difference between the variable and constant pressure chambers 6 and 5, the diaphragm 4, together with the plate 7 and the piston 8 fixed thereto, is moved forwardly and the output rod 17 is advanced by the piston 8 through the reaction force member 18. The master piston 16 is pushed by the output rod 17, whereby the master cylinder 10 generates a braking pressure in dependence on the strength which the driver exerts on the brake pedal 24.

The piston 8 elastically deforms the reaction force member 18 with the force whose strength corresponds to the difference between the pressures acting on the both surfaces of the diaphragm 4, and pushes the master piston 16 through the output rod 17 while advancing relative to the air valve member 22. At this time, the control valve body 20 is pushed onto the piston 8 under the pressure difference between the atmospheric pressure and the negative pressure acting upon the negative pressure valve operating portion 20e, whereby the control valve body 20 is advanced together with the piston 8. This causes the piston 8 to push the output rod 17 with the power that meets the stepping force exerted on the brake pedal 24. As a result, the air valve operating portion 20f is brought into abutment with the air valve portion 22a to thereby block the fluid communication of the variable pressure chamber 6 with the atmosphere, whereby the braking pressure is maintained at a value in dependence on the force exerted on the brake pedal 24.

At the same time with this, the force with which the brake pedal 24 is stepped on is transmitted to the reaction force member 18 from the connection rod 22b of the air valve member 22 through the input rod 25. Since this causes the reaction force member 18 is deformed in dependence on the pedal stepping force, the driver can feel the reaction force. As the control valve body 20 is moved together with the piston 8, the cylindrical portion 20d intrudes into the booster shell 1 while turning up the flexible seal member 21, thereby to seal the variable pressure chamber 6 from the atmosphere.

When the brake pedal 24 is released, the air valve member 22 is moved back by the force of the compression spring 23 relative to a piston 8. Thus, the control valve body 20 which is being pressured upon the piston 8 due to the difference between the atmospheric pressure and the negative pressure both acting on the negative pressure valve operating portion 20e is moved relative to the piston 8 to separate the negative pressure valve operating portion 20e from the negative pressure valve portion 8g. This permits the negative pressure within the constant pressure chamber 5 to be led to the variable pressure chamber 6 via the valve holes 8f, whereby the pressure difference between the variable pressure chamber 6 and the constant pressure chambers 5 is lost. Thanks to the force of the compression spring 28 for returning the master piston 16 to its home position, the piston 8, the plate 7 and the diaphragm 4 are moved back together with the master piston 16 to depressurize the master cylinder 10. Further, the air valve member 22 and the control valve body 20, together with the piston 8, are retracted until the control valve body 20 is restricted from further retraction upon abutment with the circumferential edge of the through hole 3b. Following such abutment, the piston 8 is further retracted this time relative to the control valve body 20 against the compression spring 23, and this brings the negative pressure valve portion 8g into abutment with the negative pressure valve operating portion 20e, whereby the fluid communication between the constant pressure chamber 5 and the variable pressure chamber 6 is shut off. When the control valve body 20 is moved rearwardly together with the piston 8, the cylindrical portion 20d comes outside the booster shell 1 through the through hole 3b while being covered with the flexible seal member 21 extending therefrom.

The cross-section area Sb of the portion at which the master piston 16 penetrates the front shell 2 airtightly is chosen to nearly equal to or larger than the effective area Sa over which the atmospheric pressure acts on the piston 8 through the through hole 3b of the rear shell 3. For this reason, when the negative pressure of the constant pressure chamber 5 is introduced into the variable pressure chamber 6, the piston 8 is urged to move rearwardly by the force that the difference between the cross-section area Sb of the master piston 16 and the effective section area Sa makes by being multiplied with the atmospheric pressure. This advantageously ensures that even without employing the compression spring 28 for rearwardly urging the diaphragm 4 as partition member or even with the compression spring 28 of a weaker resilient force, the diaphragm 4 and hence, the piston 8 can be reliably retracted rearwardly.

Further, when the pressure difference between the constant pressure chamber 5 and the variable pressure chamber 6 causes the diagram 4, the plate 7, the piston 8 and so on to be moved in the front-rear direction, the guide 15 fixed to the plate 7 is smoothly guided along the tie-rod 11g also acting as guide bar in the front-rear direction. For this reason, the piston 8 can be precisely guided in its axial direction without being tilted with the tilting motion of the input rod 25. Consequently, it does not occur that the master piston 16 is axially pushed with the load acting at an off-center portion of the master piston 16. It also does not occur that the piston 8 is retracted with itself being tilted thereby to harm the smooth movement of the control valve body 20.

As described in detail, in the first embodiment according to the present invention, when the brake pedal 24 is stepped on and the air valve member 22 is forwardly moved through the input rod 25 against the resilient member (spring) 23, the air valve portion 22a of the air valve member 22 is separated from the air valve operating portion 20f of the control valve body 20. Thus, the atmospheric air is flown into the variable pressure chamber 6, and the partition member (diaphragm) 4 and the piston 8 are forwardly moved in response to the pressure difference which occurs between the variable and constant pressure chambers 5 and 6, to push the output member 17, whereby the master piston 16 of the master cylinder 10 is advanced to generate braking pressure.

When the brake pedal 24 is released, the air valve member 22 is moved by the resilient member 23 rearwardly the predetermined amount relative to the piston 8. This causes the air valve portion 22a to come to abutment with the air valve operation portion 20f of the control valve body 20. Thus, the variable pressure chamber 6 is blocked from the atmospheric pressure, and at the same time, the control valve body 20 is separated from the rear surface of the piston 8, whereby the negative pressure valve operating portion 20e of the control valve body 20 opens the negative pressure valve portion 8g of the piston 8. The negative pressure in the constant pressure chamber 6 is led through the valve holes 8f into the variable pressure chamber 5, and the pressure difference across the both chambers 6 and 5 is cancelled. This enables the partition member 4 and the piston 8 to be moved rearwardly by the force of the compression spring 28 which urges the master piston 16.

After the control valve body 20 moved rearwardly together with the piston 8 is brought into abutment with the rear wall 3 of the booster shell 1, the piston 8 is further moved rearwardly a bit of amount and is stopped with the negative pressure valve portion 8g around the valve hole 8f being closed by the negative pressure valve operating portion 20e of the control valve body 20.

As summarized above, in the first embodiment according to the present invention, the piston 8 which receives the air valve member 22 and the resilient member 23 in the cave 8h can be made small and simplified in shape, and the parts which constitute the piston 8 and valve means for cooperating the piston 8 can decreased in number.

Further, in the first embodiment, the piston 8 is arranged inside the booster shell 1, and the cylindrical member 20d surrounding the input rod 25 is protruded from the control valve body 20 to extend rearwardly through the rear wall 3 of the booster shell 1. The flexible seal member 21 is secured airtightly at one end to the rear wall 3 of the booster shell 1 while surrounding the through hole 3b of the rear wall 3 and also airtightly at the other end to the rear end of the cylindrical member 20d. With this configuration, the entire length of the brake booster device can be shortened, thereby making the same easier to install in vehicles. In addition, as the piston 8 is moved forwardly within the booster shell 1, the cylindrical member 20d is entered into the booster shell 1 while turning up the flexible seal member 21. This advantageously realizes that the variable pressure chamber 6 can be sealed reliably from the atmospheric pressure.

Figure 4:
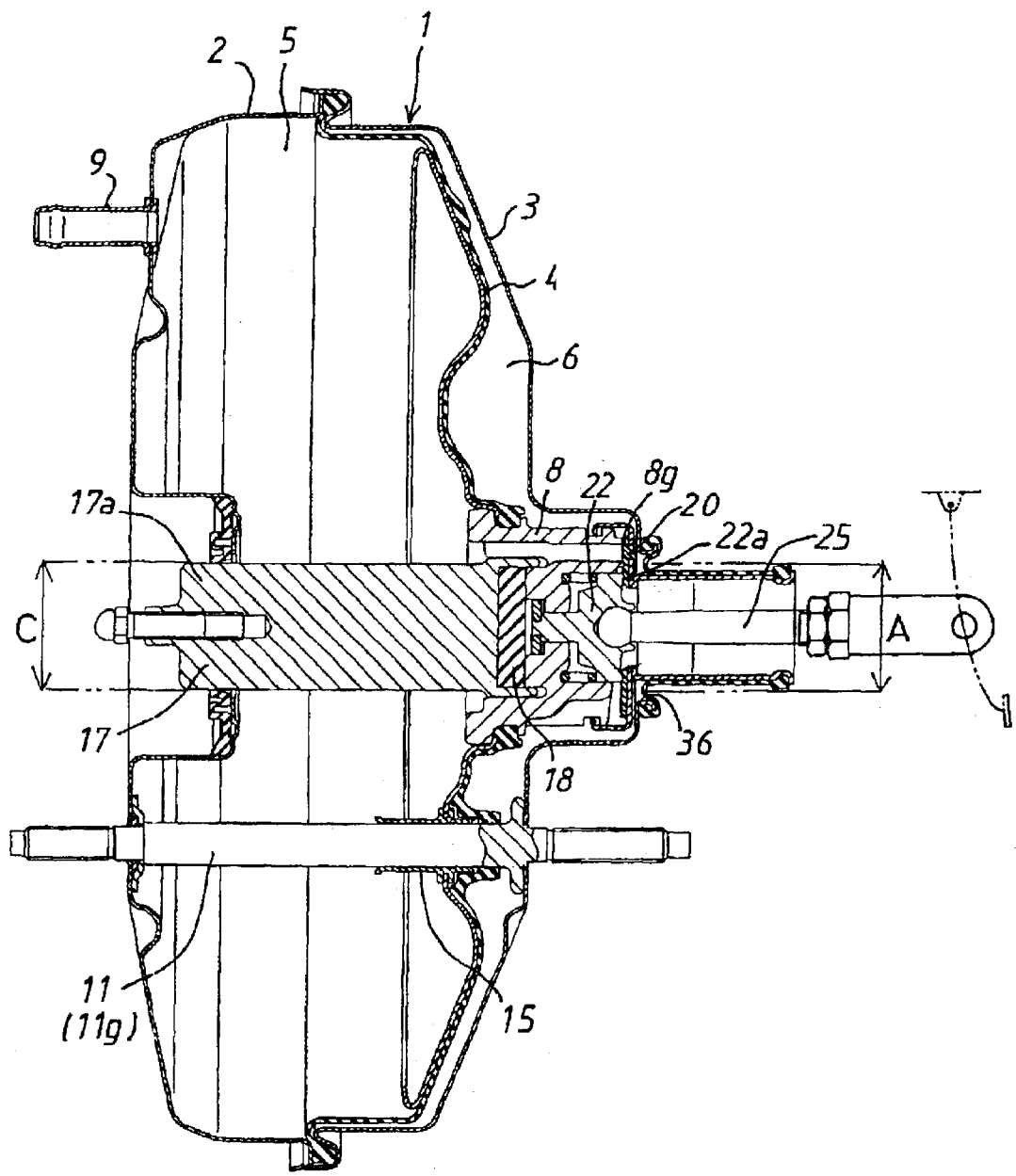
FIG. 4 is a longitudinal section of a second embodiment according to the present invention.

FIG. 4 shows a second embodiment according to the present invention. In this embodiment, a booster shell 1 is not directly secured to a master cylinder, not shown. More specifically, instead of a master piston, not shown, passing through a front shell 2 airtightly, an output rod 17 passes through the front shell 2 airtightly and is in abutting engagement with the master piston of the master cylinder outside the booster shell 1. In this embodiment, the output rod 17 serves as an output member which passes through the front shell 2 of the booster shell 1 airtightly, and the cross-section area Sc of the portion at which a rod part 17a of the output rod 17 passes through the front shell 2 airtightly is chosen to be nearly equal to or larger than the effective area Sa over which the air pressure acts on a piston 8 via a through hole 3b. In other words, the diameter C of the rod portion 17a of the output rod 17 is determined to be nearly equal to or larger than the diameter A. Because other parts of the second embodiment are identical to those in the first embodiment, further description is omitted by giving the same reference numerals to those parts same in function.

Figure 5:
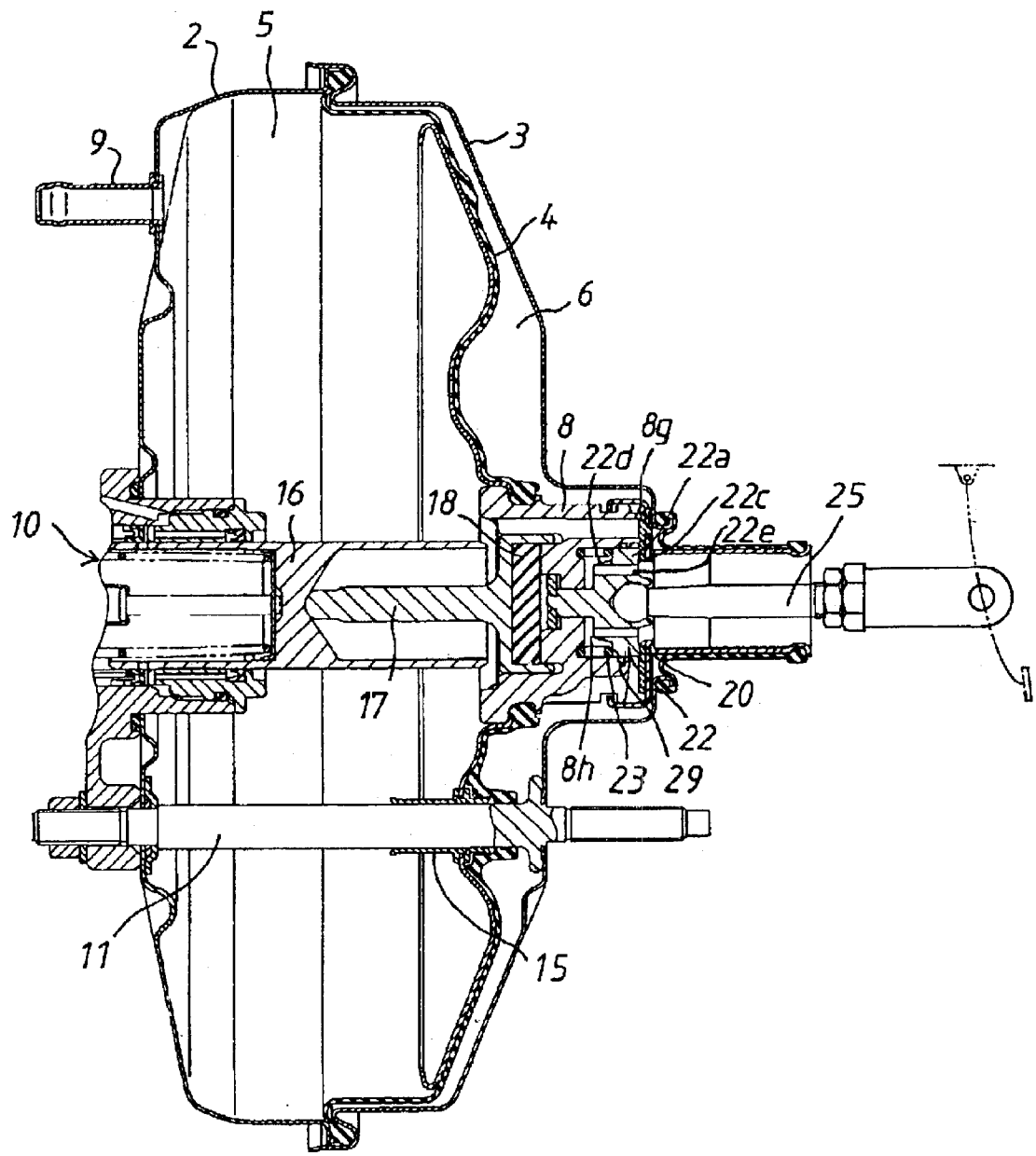
FIG. 5 is a longitudinal section of a third embodiment according to the present invention.
Figure 6:
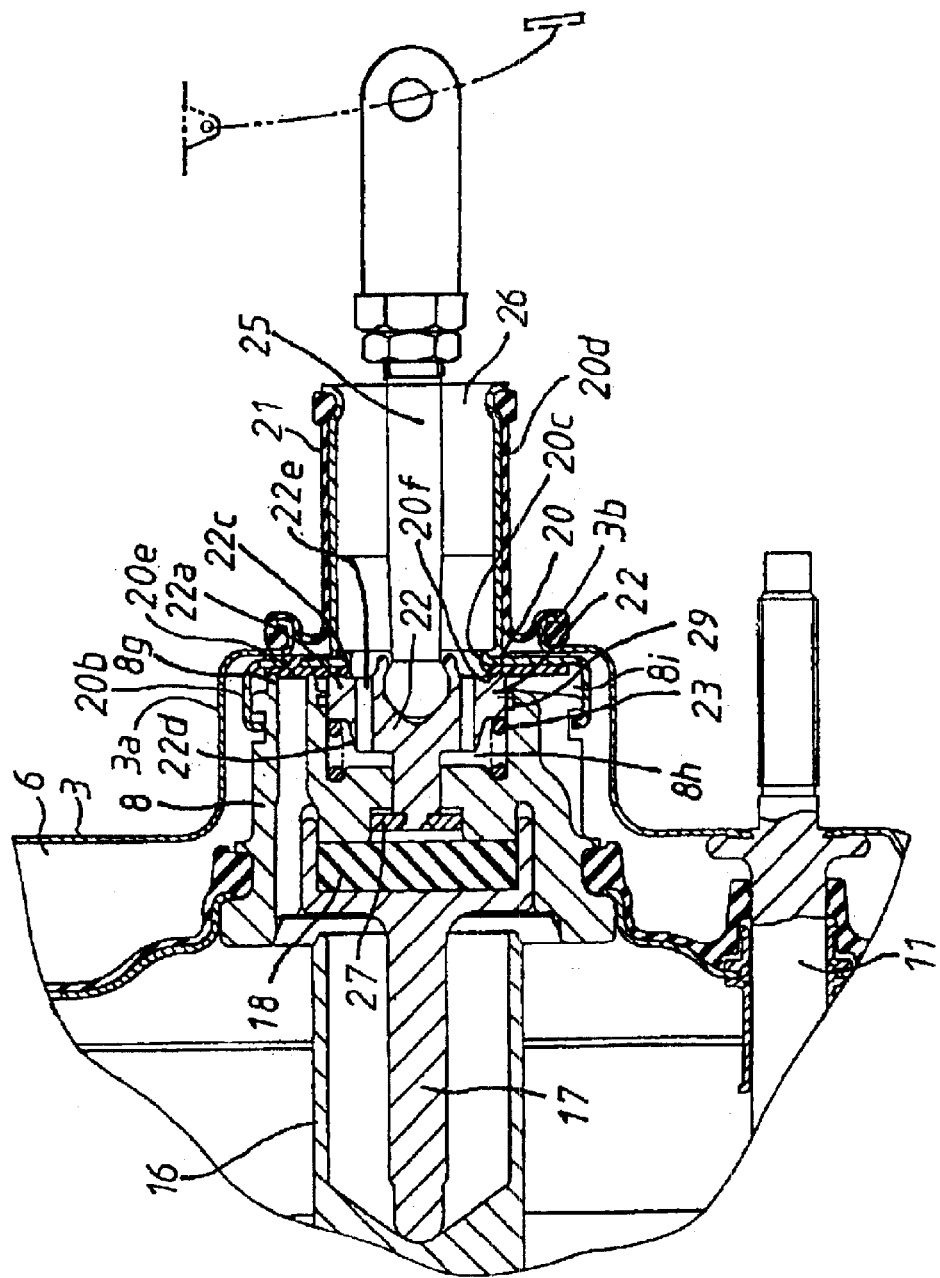
FIG. 6 is an enlarged, fragmentary sectional view of the rear central part of the device shown in FIG. 5.

FIGS. 5 and 6 show a third embodiment according to the present invention. In this embodiment, into a cave 8h formed at the rear end of a piston 8, an air valve member 22 is inserted slidably in the front-rear direction with airtight sealing kept by a seal 29. A compression spring 23 as resilient member is interposed between the bottom surface of the cave 8h and the air valve member 22. The air valve member 22 is formed therein at two diametrically opposed portions thereof with communication holes 22e for fluid communication between a space radially inside the air pressure valve 22a formed at the rear surface 22c of the air valve member 22 and the front end surface 22d facing the compression spring 23. Thus, the space between the air pressure valve member 22 and the bottom surface of the cave 8h is put under the atmospheric pressure, in which state the load required to separate the air valve portion 22a from the air valve operating portion 20f of the control valve body 20 is restrained from fluctuating in dependence on the variation in the negative pressure in the variable pressure chamber 6. Other configurations of this embodiment are same as those in the first embodiment.

As the outstanding feature common to all of the embodiments according to the present invention, the cross-section area Sc of the portion at which the output member (i.e., master piston 16 or output rod 17) passes through the front shell 2 airtightly is chosen to be nearly equal to or larger than the effective area Sa over which the atmospheric pressure acts on the piston 8 via the through hole 3b.

With this configuration, when the negative pressure valve operating portion 20e of the control valve body 20 is separated from the negative pressure valve portion 8g of the piston 8, the negative pressure in the constant pressure chamber 5 is led to the variable pressure chamber 6. At this time, it is ensured that the piston 8 is moved rearwardly upon receipt of the force which is determined by multiplying the atmospheric pressure with the difference between the section area Sb of the portion at which the output member (i.e., master piston 16 or output rod 17) passes through the front wall of the booster shell 1 and the effective area Sa over which the atmospheric pressure acts on the piston through the through hole 3b. Therefore, the returning spring like 28 for urging the partition member 4 rearwardly can be eliminated not to be used, or the resilient force of that spring 28 can be set weaker even when used. This makes it possible to eliminate or extremely diminish the internal resistance due to the resilient force of such return spring 28, so that the braking power can be reliably prevented from being lowered notably even when the negative pressure is lost.

Furthermore, the outstanding feature of the embodiments according to the present invention is directed to using the control valve body 20 which cooperates with the rear surface of the piston 8 and the air valve member 22 received in the piston 8. And, by moving the control valve body 20 relative to the piston 8 and the air valve member 22, the variable pressure chamber 6 can be controlled to communicate selectively with the negative pressure in the constant pressure chamber 5 or with the atmospheric pressure. That is, by utilizing the abutting end surfaces of the piston 8, the air valve member 22 and the control valve body 20 as fluid control valve means, the control section of the booster device can be simplified entirely in construction and the reliable operation of the control section can be assured.

Obviously, numerous modifications and variations of the present invention are possible in light of the above teachings. It is therefore to be understood that within the scope of the appended claims, the present invention may be practiced otherwise than as specifically described herein.

What is claimed to be secured by the Letters Patent of the United States is:

1. A brake booster device comprising:

a booster shell;

a partition member dividing the interior of said booster shell into a variable pressure chamber and a constant pressure chamber;

an output member passing through a front wall of said booster shell airtightly;

a piston provided bodily with said partition member for transmitting the movement in a front-rear direction of said partition member responsive to the pressure difference between said variable pressure chamber and said constant pressure chamber, to said output member;

a control valve body provided to face a rear surface of said piston and to be movable relative thereto through a predetermined amount in said front-rear direction for being restricted from further moving rearwardly upon abutment with a rear wall of said booster shell;

a seal member interposed between said rear wall of said booster shell and said control valve body for maintaining said variable pressure chamber in airtight state;

a valve hole formed in said piston and communicating with a front surface thereof exposed to said constant pressure chamber and a rear surface thereof facing said control valve body;

a negative pressure valve portion provided at the rear surface of said piston to encircle said valve hole;

a negative pressure valve operating portion provided on said control valve body for being brought into abutment with said negative pressure valve portion when said control valve body is advanced relative to said piston;

an air valve member received in a cave formed at the rear end portion of said piston to be movable in said front-rear direction and having an air valve portion formed at a rear surface of said air valve member in the form of a closed loop;

an air valve operating portion provided on said control valve body for selectively opening and closing said air valve portion;

a resilient member for rearwardly urging said air valve member towards said air valve operating portion;

a passage provided for admitting the atmospheric pressure into said variable pressure chamber when said air valve member is forwardly moved to separate said air valve portion from said air valve operating portion;

an input rod coupled to a brake pedal and passing through said rear wall of said booster shell and a through hole formed in said control valve body to be also coupled to said air valve member;

a cylindrical portion provided on said control valve body and rearwardly protruding through a through hole of the rear wall of said booster shell to surround said input rod; and wherein said seal member is composed of a cylindrical flexible member which is secured at one end thereof to a rear end of said cylindrical member and at the other end thereof to the rear wall of said booster shell while surrounding said through hole.

2. A brake booster device as set forth in claim 1, wherein:

said resilient member is interposed between a bottom surface of said cave and said air valve member;

the sliding portion between said air valve member and said cave is kept airtight; and a communication hole is formed in said air valve member to communicate with the inside of said air valve portion formed at the rear surface of said air valve member and a front surface of said air valve member facing said resilient member.

3. A brake booster device as set forth in claim 1, wherein:

a cross-section area of the portion at which said output member passes airtightly through the front wall of said booster shell is nearly equal to or larger than an effective area over which the atmospheric pressure acts on said piston through said through hole formed on the rear wall of said booster shell.

4. A brake booster device as set forth in claim 3, wherein:

said resilient member is interposed between a bottom surface of said cave and said air valve member;

the sliding portion between said air valve member and said cave is kept airtight; and a communication hole is formed in said air valve member to communicate with the inside of said air valve portion formed at the rear surface of said air valve member and a front surface of said air valve member facing said resilient member.

5. A brake booster device comprising:

a booster shell;

a partition member dividing the interior of said booster shell into a variable pressure chamber and a constant pressure chamber;

an output member passing through a front wall of said booster shell airtightly;

a piston provided bodily with said partition member for transmitting the movement in a front-rear direction of said partition member responsive to the pressure difference between said variable pressure chamber and said constant pressure chamber, to said output member;

a control valve body provided to face a rear surface of said piston and to be movable relative thereto through a predetermined amount in said front-rear direction for being restricted from further moving rearward upon abutment with a rear wall of said booster shell;

a seal member interposed between said rear wall of said booster shell and said control valve body for maintaining said variable pressure chamber in airtight state;

a valve hole formed in said piston and communicating with a front surface thereof exposed to said constant pressure chamber and a rear surface thereof facing said control valve body;

a negative pressure valve portion provided at the rear surface of said piston to encircle said valve hole;

a negative pressure valve operating portion provided on said control valve body for being brought into abutment with said negative pressure valve portion when said control valve body is advanced relative to said piston;

an air valve member received in a cave formed at the rear end portion of said piston to be movable in said front-rear direction and having an air valve portion formed at a rear surface of said air valve member in the form of a closed loop;

an air valve operating portion provided on said control valve body for selectively opening and closing said air valve portion;

a resilient member for rearwardly urging said air valve member towards said air valve operating portion;

a passage provided for admitting the atmospheric pressure into said variable pressure chamber when said air valve member is forwardly moved to separate said air valve portion from said air valve operating portion; and an input rod coupled to a brake pedal and passing through said rear wall of said booster shell and said through hole formed in said control valve body to be also coupled to said air valve member; and wherein said resilient member is interposed between a bottom surface of said cave and said air valve member;

the sliding portion between said air valve member and said cave is kept airtight; and a communication hole is formed in said air valve member to communicate with the inside of said air valve portion formed at the rear surface of said air valve member and a front surface of said air valve member facing said resilient member.

6. A brake booster device comprising:

a booster shell;

a partition member dividing the interior of said booster shell into a variable pressure chamber and a constant pressure chamber;

an output member passing through a front wall of said booster shell airtightly;

a piston provided bodily with said partition member for transmitting the movement in a front-rear direction of said partition member responsive to the pressure difference between said variable pressure chamber and said constant pressure chamber, to said output member, said piston having a valve hole which opens to front and rear surfaces thereof for communication of said constant pressure chamber with said variable pressure chamber;

an air valve member received in said piston to be movable in said front-rear direction;

a resilient member for urging said air valve member to move rearwardly relative to said piston;

an input rod coupled to a brake pedal and passing through a through hole formed at the rear wall of said booster shell to be coupled to said air valve member;

a control valve body carried to face a rear surface of said piston and to be movable relative to said piston through a predetermined amount in said front-rear direction and being restricted from further moving rearwardly upon abutment at a rear surface thereof with the rear wall of said booster shell;

a flexible seal member arranged between the rear wall of said booster shell and said control valve body for maintaining said variable pressure chamber in airtight state; and wherein said control valve body is operable to isolate said variable pressure chamber from said valve hole of said piston and the atmospheric pressure when in abutment with the rear surfaces of said piston and said air valve member but to fluidically connect said variable pressure chamber with said constant pressure chamber through said valve hole when separated from the rear surface of said piston and also to fluidically connect said variable pressure chamber to the atmospheric pressure when separated from said air valve member:

wherein said control valve body includes:

a guide portion for carrying said control valve body on said piston to be movable to and away from the rear surface of said piston through said predetermined amount; and a cylinder portion protruding from the rear surface of said control valve body rearwardly so that said cylindrical portion enters into said variable pressure chamber together with said piston when the same is moved forwardly; and wherein said flexible seal member is of a generally cylindrical shape and is secured airtightly at a front end thereof to said through hole of said booster shell and at a rear end thereof to the rear end of said cylindrical portion of said control valve body.

7. A brake booster device as set forth in claim 6, wherein:

a passage is formed in said piston for admitting the atmospheric pressure therethrough into said variable pressure chamber when said air valve member is separated from said control valve body.

8. A brake booster device as set forth in claim 7, wherein said control valve body includes:

a negative valve operating portion abuttable with a portion encircling said valve hole opening at the rear surface of said piston for selectively opening and closing said valve hole; and an air valve operating portion abuttable with the circumferential edge portion of said air valve member for selectively opening and closing said passage formed in said piston.

9. A brake booster device as set forth in claim 8, wherein:

a cross-section area of the portion at which said output member passes through the front wall of said booster shell airtightly is nearly equal to or larger than an effective area over which the atmospheric pressure acts on said piston through said through hole formed on the rear wall of said booster shell.

10. A brake booster device as set forth in claim 7, wherein:

a cross-section area of the portion at which said output member passes through the front wall of said booster shell airtightly is nearly equal to or larger than an effective area over which the atmospheric pressure acts on said piston through said through hole formed on the rear wall of said booster shell.

11. A brake booster device as set forth in claim 6, wherein:

a cross-section area of the portion at which said output member passes through the front wall of said booster shell airtightly is nearly equal to or larger than an effective area over which the atmospheric pressure acts on said piston through said through hole formed on the rear wall of said booster shell.

12. A brake booster device as set forth in claim 11, wherein:

said resilient member is interposed between said piston and said air valve member for urging the same rearwardly;

the sliding portion between said air valve member and said piston is kept airtight; and a communication hole is formed in said air valve member to communicate with the inside of said air valve portion formed at the rear surface of said air valve member and a front surface of said air valve member facing said resilient member.

* * * * *